US011856435B2

(12) United States Patent
Deshmukh et al.

(10) Patent No.: US 11,856,435 B2
(45) Date of Patent: Dec. 26, 2023

(54) HANDLING FINE TIMING MEASUREMENT REQUESTS

(71) Applicant: Hewlett Packard Enterprise Development LP, Houston, TX (US)

(72) Inventors: Amogh Guruprasad Deshmukh, Santa Clara, CA (US); Eldad Perahia, Park City, UT (US); Gaurav Patwardhan, Santa Clara, CA (US); Sachin Ganu, San Jose, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 52 days.

(21) Appl. No.: 17/218,309

(22) Filed: Mar. 31, 2021

(65) Prior Publication Data

US 2022/0322120 A1    Oct. 6, 2022

(51) Int. Cl.
*H04W 24/10* (2009.01)
*H04W 56/00* (2009.01)
*H04L 27/26* (2006.01)
*H04L 43/0864* (2022.01)

(52) U.S. Cl.
CPC .......... *H04W 24/10* (2013.01); *H04L 27/266* (2013.01); *H04L 27/2665* (2013.01); *H04L 43/0864* (2013.01); *H04W 56/0035* (2013.01)

(58) Field of Classification Search
CPC ............ H04W 24/10; H04W 56/0035; H04L 27/266; H04L 27/2665; H04L 43/0864; G01S 13/767
See application file for complete search history.

(56) References Cited

U.S. PATENT DOCUMENTS

| 9,474,041 | B1 | 10/2016 | Zhang et al. |
| 10,104,493 | B2 | 10/2018 | Wang et al. |
| 11,297,591 | B1* | 4/2022 | El Ferkouss .......... H04W 76/10 |
| 2014/0355462 | A1* | 12/2014 | Aldana .............. H04L 43/0864 370/252 |
| 2017/0142608 | A1* | 5/2017 | Vamaraju .............. G01S 13/767 |
| 2017/0238135 | A1* | 8/2017 | Vamaraju .............. H04W 4/023 455/456.1 |
| 2020/0314220 | A1 | 10/2020 | Segev et al. |
| 2021/0392568 | A1* | 12/2021 | Henry .................. H04W 24/08 |

FOREIGN PATENT DOCUMENTS

WO    WO-2017026976    2/2017

OTHER PUBLICATIONS

Horn K.P.B., Doubling the Accuracy of Indoor Positioning: Frequency Diversity, (Research Paper), Sensors, vol. 20, Issue 5, Mar. 9, 2020, 21 Pgs.

* cited by examiner

*Primary Examiner* — Huy D Vu
*Assistant Examiner* — Robert Ma
(74) *Attorney, Agent, or Firm* — Hewlett Packard Enterprise Patent Department (57) ABSTRACT

Some examples of handling FTM requests comprises receiving a plurality of fine timing measurement (FTM) requests from a second network device over a first channel. Determining a channel traffic along the first channel. Adjusting a FTM response frequency based on the channel traffic. Responding based on the FTM response frequency, to a first number of FTM requests out of the plurality of FTM requests.

21 Claims, 8 Drawing Sheets

HANDLING FINE TIMING MEASUREMENT REQUESTS

BACKGROUND

Generally, in a Wireless Local Area Network (WLAN), one or more Access Points (APs) may be deployed. Communication devices such as laptops, personal computers; smartphones, etc. may connect to the WLAN to exchange data within the network. The communication devices can raise ranging requests with the one or more APs.

Ranging techniques such as a Fine Timing Measurement (FTM) protocol have attained prominence due to wide compatibility between the APs and the communication devices. The FTM protocol, typically, comprises exchange of messages between the APs and the communication devices. From the messages, a time of flight, a round trip time, etc. is derived, which is used for determining a position of the communication device with reference to the AP. For example, the time of flight can be defined as the overall time taken by signals to propagate from the AP to a client device (say, the communication device), and back to the AP from the client device. From the time of flight information, a distance between the AP and the client device may be determined.

BRIEF DESCRIPTION OF DRAWINGS

The present subject matter can be best understood by referring to the following description and the accompanying drawings that are used to illustrate example(s) of the present subject matter.

DETAILED DESCRIPTION

There is an increasing adoption of FTM protocol among different client devices and APs. The FTM protocol is used to establish a range between a responding device (e.g., AP) and the client device. An initiator sends multiple sets of range measurements/ranging requests to different APs. The initiator of the range measurements can estimate its relative position with reference to APs. A common implementation has the client device as the initiator of range measurements and the AP serving as a responder. With many of the communication devices supporting the FTM protocol, each AP in a network may receive multiple ranging requests. In certain circumstances, the AP may get overloaded with these multiple ranging requests that consume significant airtime. Whereas, some other client devices may raise multiple ranging requests within short time intervals, which may also overload the AP. With this kind of management traffic, the APs are engaged with responding to these ranging requests thereby congesting a channel on which these devices communicate.

Further, many wireless networking standards, for e.g., Institute of Electrical and Electronics Engineers (IEEE) 802.11 mc, allow both associated and non-associated client devices to raise ranging requests. This further causes an increase in channel traffic with multiple FTM requests from both the associated and the non-associated devices. The APs would be serving the associated clients for FTM and non-FTM related traffic. In addition, the APs would be responding to the multiple FTM requests from the non-associated clients. This will add to the contention delays on the channel. For instance, if the AP is serving high priority traffic, such as voice/video or VoIP (Voice Over Internet Protocol) traffic, and receives multiple ranging requests in parallel, the AP may not be able to respond to the ranging requests while serving the data traffic. This may lead to denial of service to certain client devices. Furthermore, a client device, which is associated with a particular AP on one channel, may still send ranging request to another AP on a different channel thereby keeping APs engaged.

Further, even with certain wireless networking standards supporting more than one frequency band, say a tri-band, there still exists challenges. For example, certain client devices performing FTM post-association requires the AP and the client device to complete an FTM transaction on one channel. If an AP decides to perform a channel switch announcement, the AP then requires all client devices to switch to the new channel. With the associated and the non-associated client devices, there exists high airtime utilization by the ranging requests. Hence, there is a need for addressing the aforementioned technical short comings.

Hence, the present subject matter discloses various examples of handling FTM requests. A first network device receives a plurality of FTM requests from a second network device, over a first channel. For brevity, the second network device is referred to in singular form. However, the plurality of FTM requests could be from more than one second network device. In one example, the first network device is an access point and the second network device can be a client device or another access point. The first network device determines a channel traffic along the first channel. Based on the channel traffic, the first network device may adjust a FTM response frequency.

For example, when the channel traffic is high, then the FTM response frequency may be adjusted, which includes reducing the FTM response frequency. The FTM response frequency may be a rate at which the first network device responds to FTM requests/ranging requests. With the adjustment of the FTM response frequency, the first network device may respond to only a first number of FTM requests out of the plurality of the FTM requests. Thus, when the first network device determines that the first channel is busy, it adjusts the FTM response frequency and responds to only a certain number of requests i.e., the first number of FTM requests. In one example, the adjustment of the FTM response frequency increases time gap between successive FTM exchanges. Thus, in the present subject matter the AP, such as the first network device may reduce any contention delays when a requirement for serving critical requests or for responding to requests from associated devices arise. Further, any potential 'denial-of-service attack (DoS attack)' due to increase in number of FTM requests on the network, is avoided. Because, in certain conditions, a particular network device may indefinitely send FTM requests, disrupting services of the first network device. Such indefinite sending of FTM requests may be referred to as DoS attack. In one example, the first network device adjusts the FTM response frequency whereby reducing chances of denial of service to other network devices in the network. The features and advantages of the present subject matter can be better understood from the following description of certain examples.

In the drawings, certain features and components may be exaggerated in scale or in schematic form, and certain details of few elements may not be shown for brevity, and not by way of limitation.

Further, the following description refers to the examples illustrated in the accompanying drawings. Wherever possible, same reference signs are used, to refer to same or similar features. While several examples are described in the description, modifications, adaptations, and other implementations are possible. The following examples do not limit the scope of the present subject matter.

Figure 1:
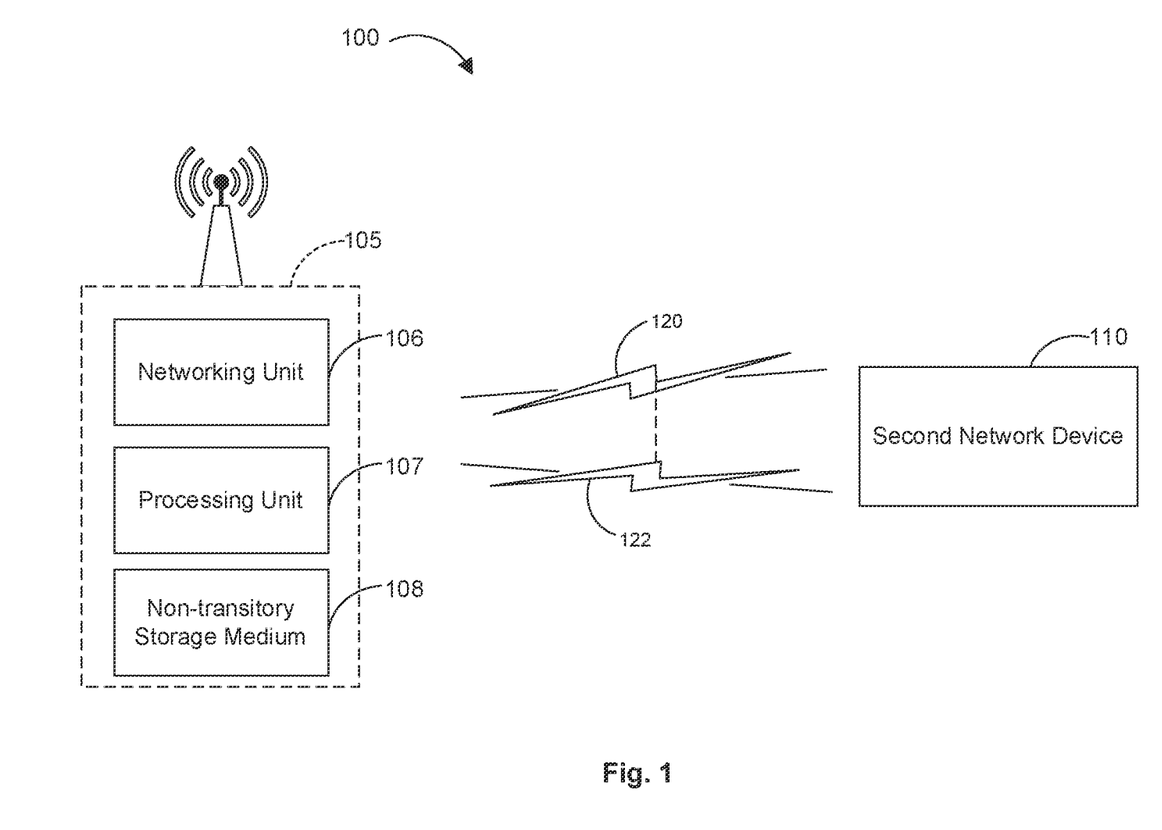
FIG. 1 illustrates a schematic view of a network, in accordance with an example of the present subject matter.

FIG. 1 illustrates a schematic view of a network, in accordance with an example of the present subject matter. The network 100 comprises a first network device 105 (for brevity, a singular refence is made and not by way of limitation). Further, the network 100 comprises a second network devices 110. In the illustrated example, only one second network device 110 is illustrated. However, there may be more than one second network devices 110. The first network device 105 may be an AP and the second network device may be a client device. The first network device 105 is capable of operating in one or more of the frequency bands that includes, but not limited to, 2.4 gigahertz (GHz), 5 GHz and/or 6 GHz.

The second network device 110 may include a mobile-network device, a stationary-network device, or another access point. When more than one second network device is available, they are capable of communicating directly between them through one or more communication networks. Alternatively, they can communicate with each other via the first network device 105 through a suitable wireless communication network.

The wireless communication network includes an IEEE 802.11 standard. The first network device 105 and the second network device 110 are each provided with one or more antennas that are capable of communication over the IEEE 802.11 standards. In the current example, the first network device 105, and the second network device 110 are compatible with IEEE 802.11ax, IEEE 802.11ac, and other earlier standards.

The first network device 105 includes a hardware and/or a plurality of machine-executable instructions for communication over a wireless communication network such as Wireless Fidelity (Wi-Fi), For example, as illustrated, the first network device 105 comprises a networking unit 106, a processing unit 107 and a non-transitory (computer readable) storage medium 108. The communication network comprises two or more bands and further, each band is provided with plurality of channels for communication.

The second network device 110 comprises FTM capabilities and is capable of sending ranging requests to the first network device 105. The ranging requests enable determination of a distance of the second network device 110 with reference to the first network device 105. A first channel 120 along which the first network device 105 and the second network device 110 communicate, may experience high traffic due to the FTM transactions from various associated and non-associated client devices. The associated client devices are devices that may have completed an association process and are capable of exchanging real data or application data. Whereas, the non-associated client devices are allowed to perform/raise certain requests like FTM requests even without completing the association process. The first network device 105 of the present subject is capable of handling management traffic like the FTM requests from these associated- or non-associated client devices.

In one example, the first network device 105 is capable of multi-link operation (MLO). The first network device 105 is capable of operating on one or more of the frequency bands that includes, but not limited to, 2.4 GHz, 5 GHz, and/or 6 GHz and each frequency band may comprise of plurality of channels 120-122. Correspondingly, the second network device 110 (say, the client device) is capable of multi-link operation. With the multi-link operation capability, the first network device 105 is capable of performing FTM transaction across multiple links/channels. The first network device 105 is capable of recognizing channels supported by the second network device 110 and links with the available channels.

Figure 2:
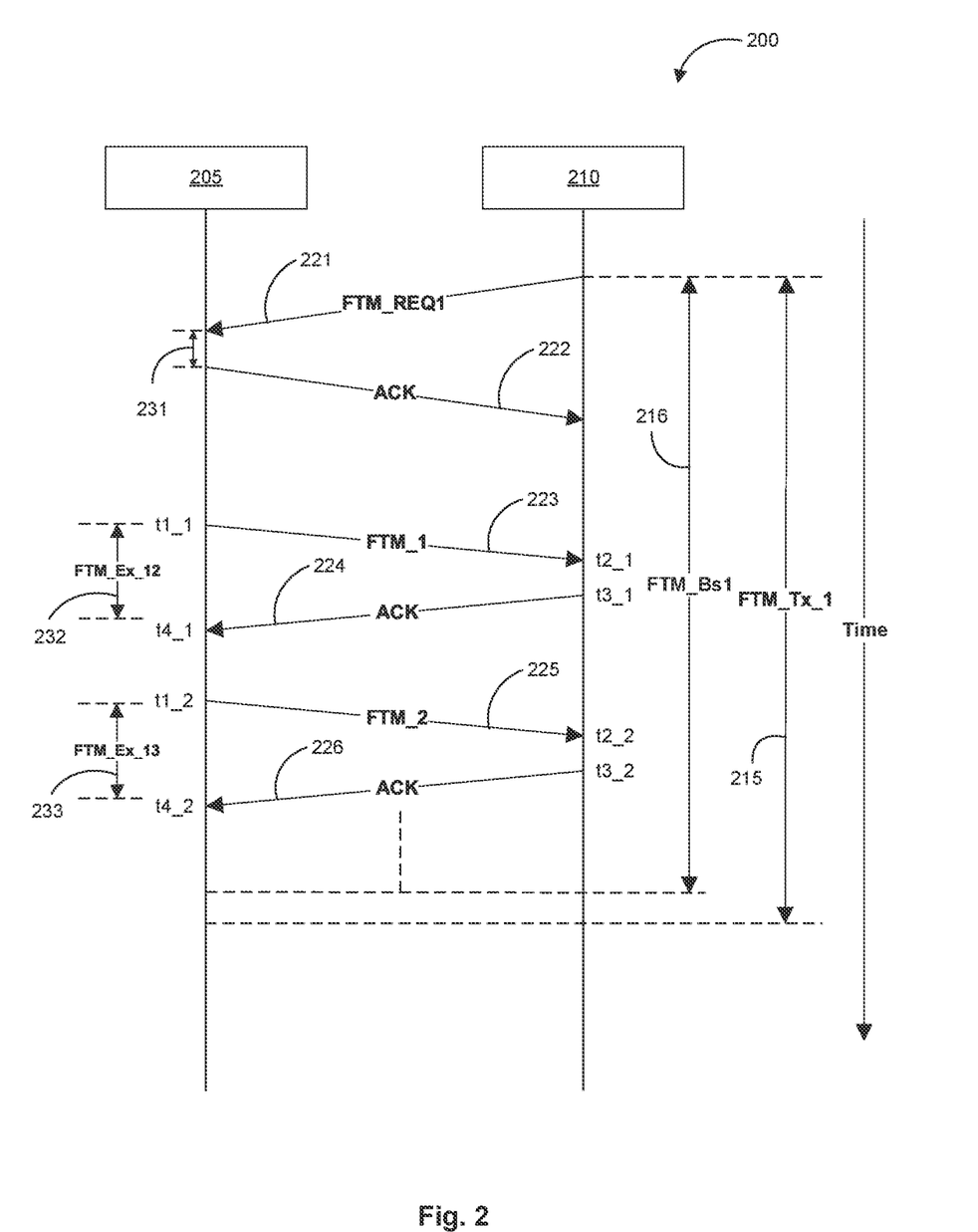
FIG. 2 illustrates a schematic view of FTM transaction between a first network device and a second network device, in accordance with an example.

FIG. 2 illustrates a schematic view 200 of FTM transaction 215 between a first network device 205 and a second network device 210, which would enable understanding of the present subject matter. The FTM transaction 215 may comprise one or more FTM bursts. In the illustrated example, the FTM transaction 215 comprises one FTM burst 216. The second network device 210 initiates a ranging request by sending a FTM request 221 to the first network device 205. The first network device 205 responds with an acknowledgement 222. The second network device 210 acts as an initialing device and the first network device 205 acts a responding device. The FTM request 221 and the corresponding acknowledgement 222 may be considered as a handshake process whereby objective to perform ranging operation is established.

Further on, the first network device 205 and the second network device 210 may exchange multiple frames corresponding to FTM requests and corresponding acknowledgements. Each FTM request 221, 223, 225 and a corresponding acknowledgement 222, 224, 226 together constitute an 'FTM exchange.' Thus, each FTM burst may comprise one or more FTM exchanges. In the illustrated example, the FTM transaction 215 comprises only one FTM burst 216. The FTM burst 216 comprises three FTM exchanges 231, 232, 233.

In the illustrated example, at time t1_1, the first network device 205 transmits a first FTM request 223 related frame to the second network device 210. The first network device 205 may record a time of departure of the first FTM request 223. At t2_1, the second network device 210 receives the first FTM request 223 and records time of arrival i.e. t2_1. At t3_1, the second network device 210 responds to the first network device 205 by sending an acknowledgement 224 related frame to the first network device 205. At t4_1, the first network device 205 receives the acknowledgment 224 related frame and records the time i.e. t4_1. The departure time and arrival time/timestamps t1_1, t2_1, t3_1, t4_1 may be used for obtaining a round trip time (RTT). Similarly, timestamps t1_2 to t4__2 correspond to another FTM exchange 233. From the round-trip time, the ranging related parameters such as distance are obtained. Further, for accuracy, more than one FTM exchange may be negotiated between the first network device 205 and the second network device 210. For example, the FTM burst 216 may include multiple FTM exchanges 231, 232, 233 and so on. In one example, the second network device 210 may initiate many such FTM requests, which may be followed by a series of FTM exchanges between the first network device 205 and the second network device 210 thereby resulting in multiple FTM bursts. One or more client devices, such as the second network device, raise a plurality of/multiple FTM requests within a short duration, which may cause contention delays.

Figure 3:
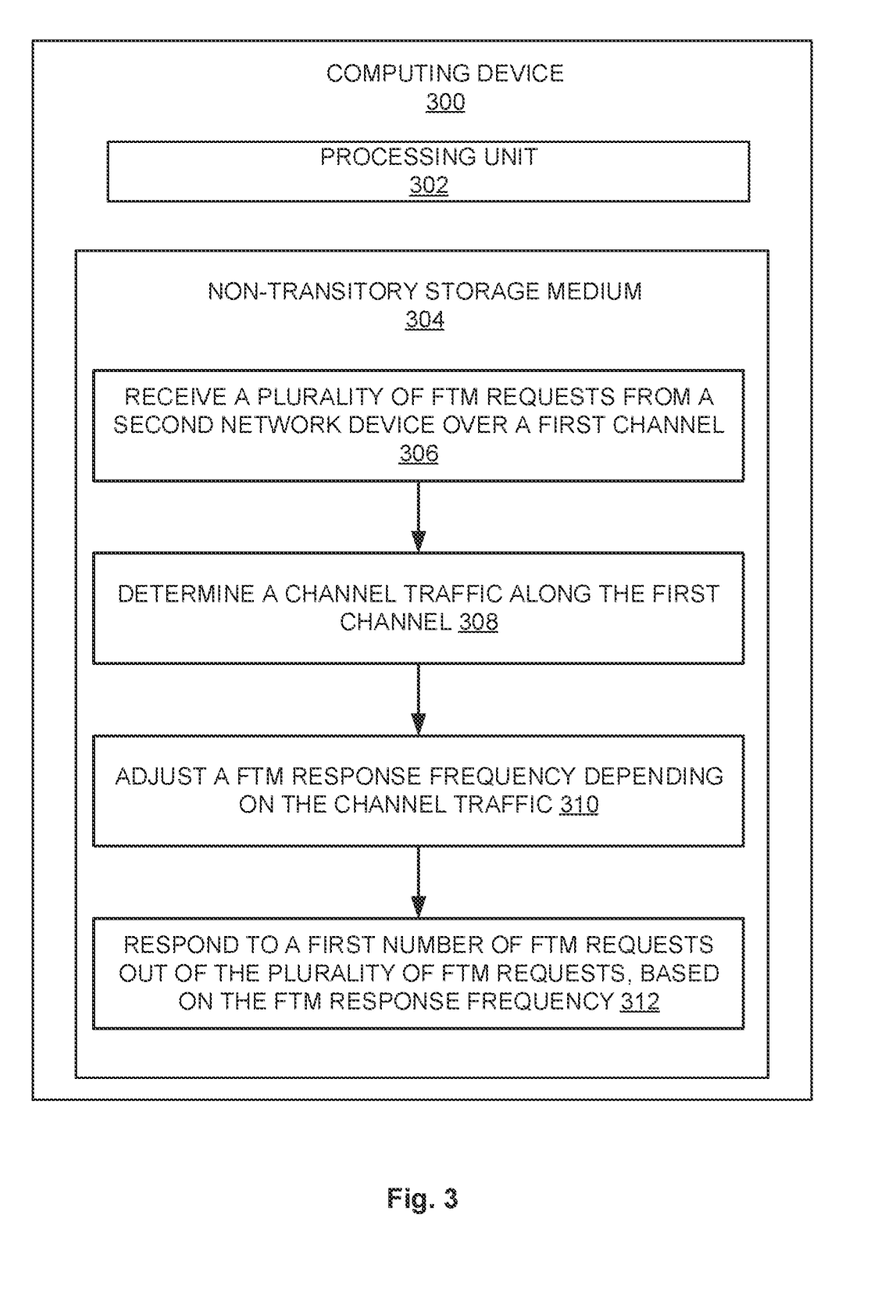
FIG. 3 illustrates a block diagram of a computing device for handling FTM requests, in accordance with an example of the present subject matter.

FIG. 3 is a block diagram of a computing device 300 for handling multiple FTM requests, in accordance with an example of the present subject matter. The computing device 300 may include an AP. In another example, the computing device 300 may function as a client device, such as a computer, a smartphone, etc. In one example, the computing device 300 may function as the first network device. In another example, the computing device 300 may be a part of the first network device.

The computing device 300 includes a processing unit 302, and non-transitory (machine-readable) storage medium 304. The processing unit 302 may comprise one or more central processing units (CPUs), semiconductor-based microprocessors, and/or other hardware devices suitable for retrieval and execution of instructions stored in the non-transitory storage medium 304. The processing unit 302 may fetch, decode, and execute instructions, such as instructions 306-312, to control processes or operations for handling multiple FTM requests. The non-transitory storage medium 304 may be any electronic, magnetic, optical, or other physical storage device that contains or stores executable instructions. Thus, non-transitory storage medium 304 may be encoded with executable instructions, for example, instructions 306-312. Further, the instructions 306-312 may be performed in any order, at any time, may be performed repeatedly, and/or may be performed by any suitable device or devices.

At 306, the computing device 300 receives a plurality of FTM requests from a second network device, over a first channel. Instead of one second network device, multiple client devices may send FTM/ranging requests, along the first channel, to determine a distance between each of the client device and the AP. Thus, multiple FTM requests may be received, in parallel, from the multiple client devices.

At 308, the computing device 300 determines a channel traffic along the first channel. The computing device 300 may be configured to determine the channel traffic based on a number of FTM requests that are received by the computing device 300, during a selected time period. In one example, the processing unit 302 of the computing device 300 itself determines the channel traffic. In another example, the computing device 300 may receive the channel traffic related information from a traffic indicator unit.

At 310, the computing device 300 adjusts a FTM response frequency, based on the channel traffic. The FTM response frequency may be a frequency/rate at which the computing device 300 responds to the FTM requests that are raised by the client device(s). In one example, when the channel traffic along the first channel is low, the FTM response frequency may be set to high or at an optimal value whereby the FTM requests are accepted and corresponding FTM bursts are negotiated. Further, in one example, the FTM response frequency for various channel traffic conditions may be predefined. A look-up table containing various FTM response frequencies corresponding to various traffic conditions may be available with the computing device 300. The computing device 300 may access the look-up table and select one FTM response frequency based on the channel traffic that is determined. In another example, the look-up table may be retrieved from a storage unit disposed outside of the computing device 300.

At 312, based on the adjustment of the FTM response frequency, the computing device 300 responds to a first number of FTM requests out of the plurality of FTM requests, which are raised by the client device(s). The first number of FTM requests may be from a single client device. In another example, the first number of FTM requests may be from two or more client devices. In yet another example, the first number of FTM requests may be from set of client devices out of the plurality of client devices. With the adjustment of the FTM response frequency, the computing device 300 may deny service or may not acknowledge certain FTM requests. The computing device 300 retains airtime for responding to any potential critical service requests such as service requests from associated device or high priority devices.

Figure 4A:
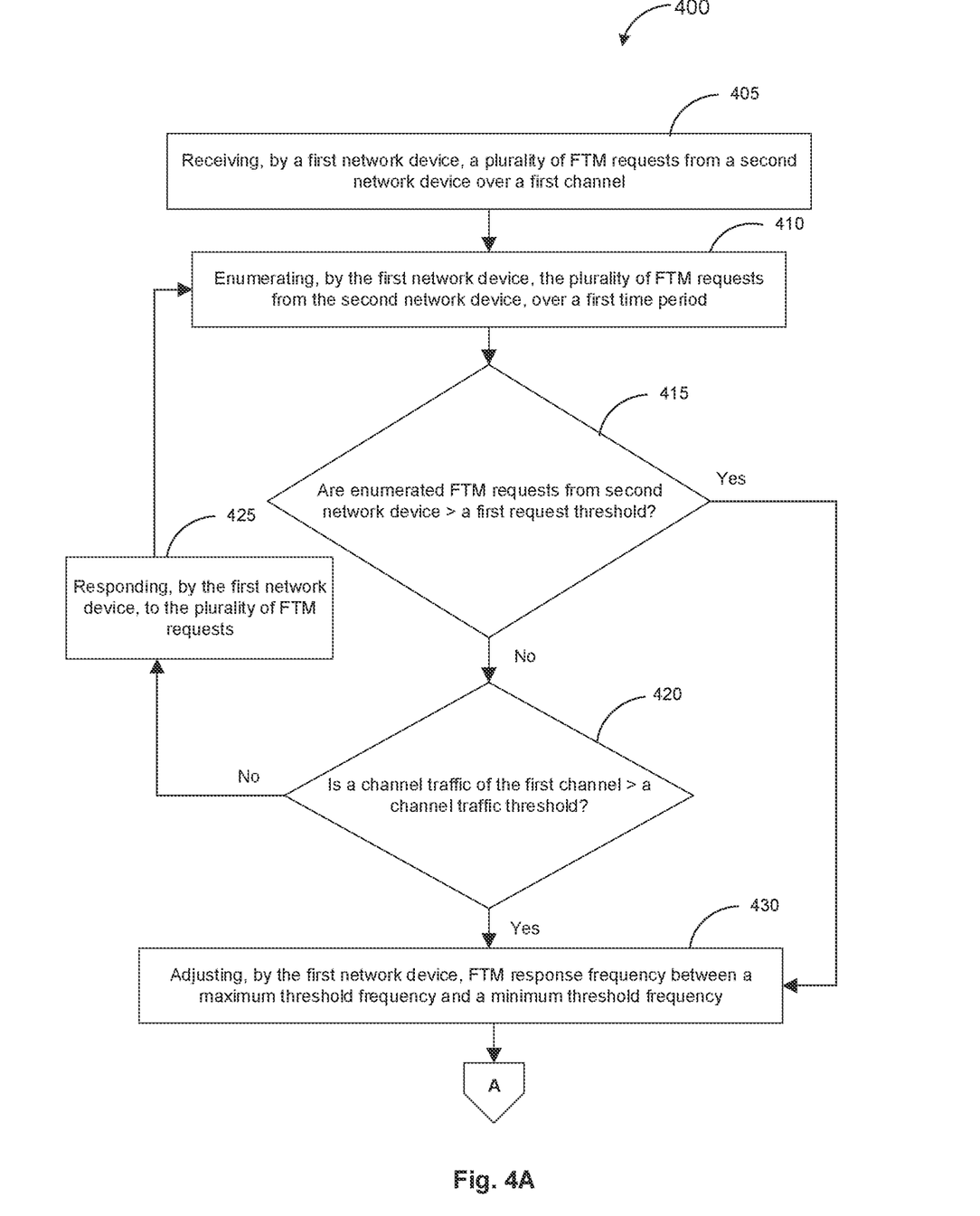
FIGS. 4A-4C depict a flow diagram illustrating a method of operation of a first network device, in accordance with an example of the present subject matter.
Figure 4B:
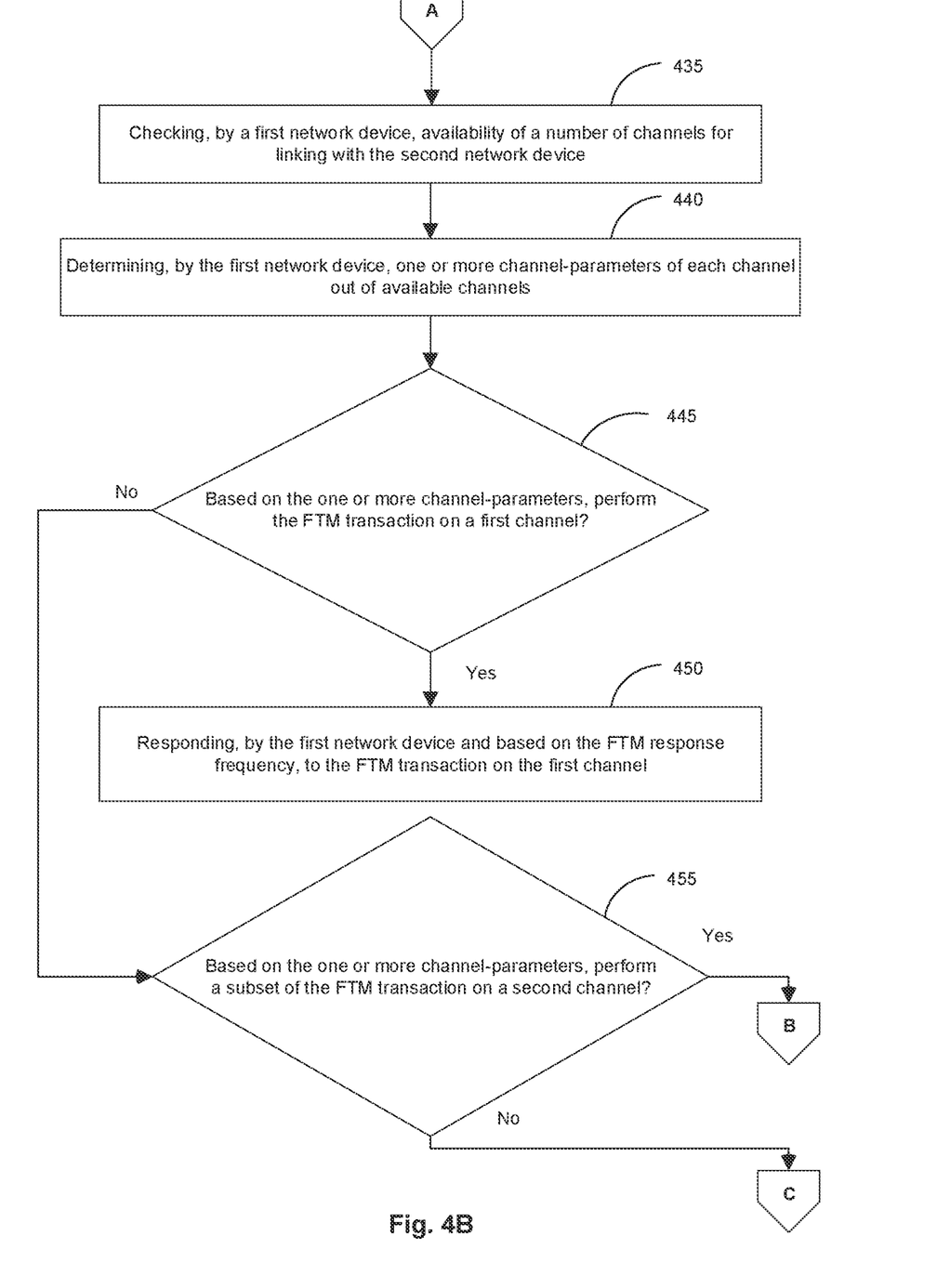
Figure 4C:
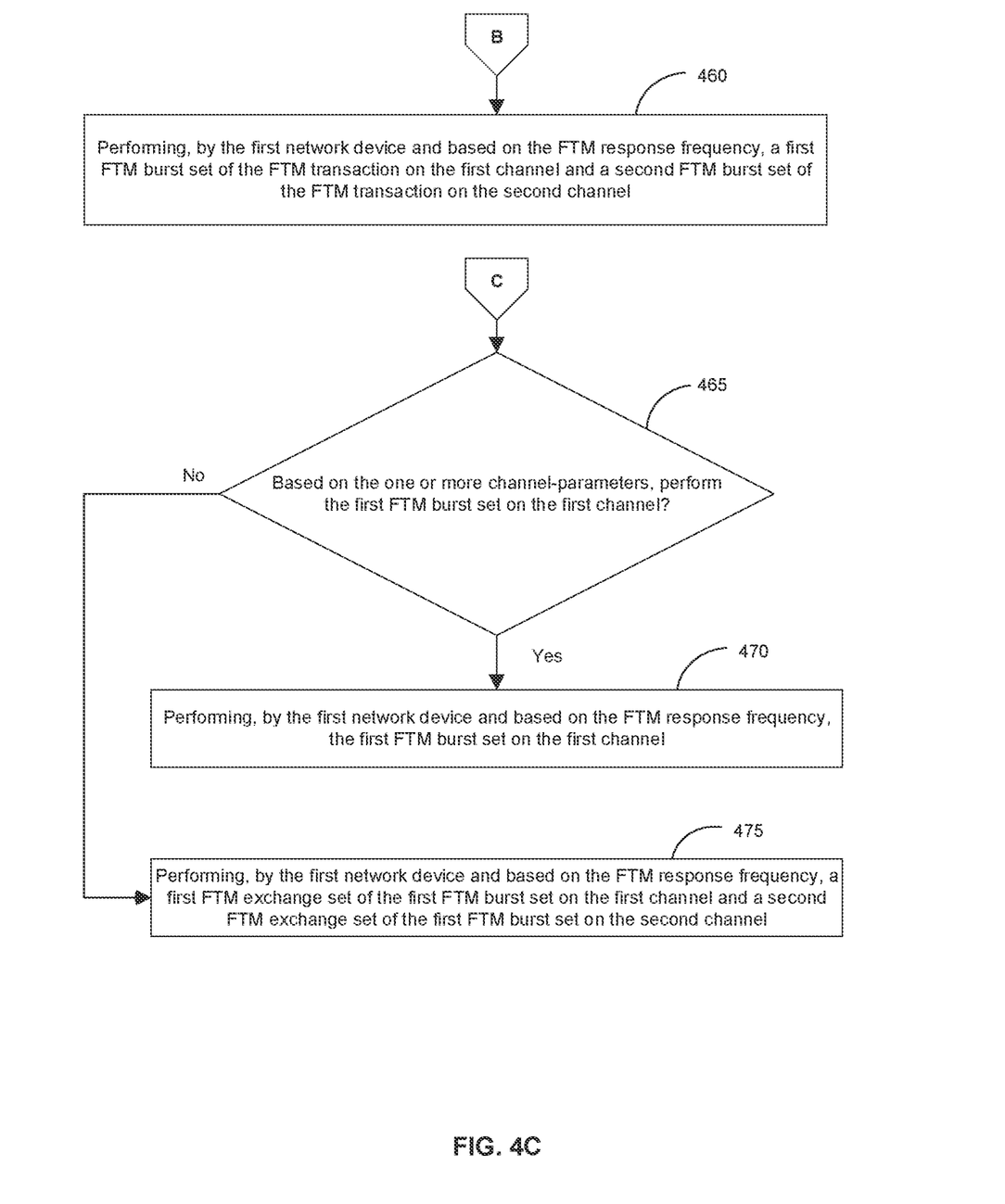

FIGS. 4A-4C illustrate a flow diagram illustrating a method 400 of operation of a first network device, with different level of details, in accordance with an example of the present subject matter. The method 400 may be executed by a processing unit of the first network device, such as an AP. The method comprises blocks 405-475 that may be in the form of instructions on a non-transitory storage medium. The method 400 may comprise other additional intermediate blocks and also, the blocks can be executed in any order other than the illustrated flow.

At block 405, the first network device receives a plurality of FTM requests over a first channel. The plurality of FTM requests may be from a single client device or from multiple client devices. Also, few FTM request out of the plurality of FTM requests may be sent in parallel by different client devices or one after another—each by different client devices.

At block 410, the first network device enumerates the plurality of FTM requests received by the first network device over a selected time period. In one example, enumeration of the FTM request may comprise counting of a number of FTM requests sent by a particular client device during the selected time period. Many such client devices may send such multiple FTM requests and enumeration may be performed for all the network devices. In one example, FTM requests from non-associated devices may be enumerated. Further, in one example, for each client device, which is sending multiple FTM request, a counter may be initiated. In another example, a counter may be initiated if within a second selected time period the client device sends a particular number of FMT requests. Setting the second selected time period may enable saving of processing and memory resources. In one example, after a selected time period, the first network device may reset a count and start enumerating a plurality of FTM requests received over a subsequent selected time period.

At block 415, the first network device compares the plurality of FTM requests that are enumerated (alternatively referred to as 'enumerated FTM requests') with a first request threshold. If the enumerated FTM requests cross the first request threshold, then the first network device may determine that the channel traffic is high. Upon determination of the channel traffic as high, the first network device may perform adjustment of a FTM response frequency, as illustrated at block 430.

Whereas, if the enumerated FTM requests do not cross the first request threshold, then at block 420, the first network device checks if the channel traffic along the first channel has crossed a channel traffic threshold. The channel traffic threshold can be a reference metric, which is used to determined channel traffic. A high traffic condition is determined, if the channel traffic along the first channel crosses the channel traffic threshold. The channel traffic may increase due to the plurality of FTM requests from multiple client device. In another example, the channel traffic may increase due to exchange or negotiation of application data/frames, which may be in addition to the FTM related exchanges or negotiations on the first channel. If the channel traffic crosses the channel traffic threshold, even in such a condition the first network device decides that the channel traffic is high. The first network device may perform adjustment of the FTM response frequency, as illustrated at block 430.

Whereas at block 420 if the channel traffic does not cross the channel traffic threshold, then at block 425, the first network device responds to the plurality of the FTM requests that were raised during the selected time period. For example, the first network device acknowledges each FTM request of the plurality of FTM requests and negotiates FTM bursts corresponding to each FTM request. In one example, the first network device may determine, based on the plurality of FTM requests received over the selected time period, that there is sufficient airtime or bandwidth to address any FTM requests or application data requests from any high priority devices or associated client devices. The first network device saves airtime and avoids any potential denial of service to any of the client devices (which otherwise could have been denied due to high number of FTM requests within the selected time period.

As mentioned earlier, if at blocks 415 or 420, the channel traffic is determined to be high then at block 430, then the first network device adjusts the FTM response frequency. In one example, the FTM response frequency is adjusted to be between a maximum threshold frequency and a minimum threshold frequency (both inclusive). Both the maximum threshold frequency and the minimum threshold frequency is adjustable individually for each AP. In one example, the minimum frequency threshold and the maximum frequency threshold are pre-set during deployment. In another example, the minimum frequency and the maximum frequency are adjustable by the user/network administrator. In other example, the adjustment of the FTM response frequency is performed by reducing the FTM response frequency. In another example, adjustment of the FTM response frequency may comprise varying the FTM response frequency in an inverse relationship with the channel traffic. Further, the adjusted FTM response frequency may cause an increase in time interval between successive FTM exchanges. In another example, a time interval between FTM exchanges corresponding to one FTM burst may not be varies and a time interval between successive PIM bursts may be varied. In one example, the first channel maintains sufficient bandwidth to respond to any potential requests from any associated or other critical client device.

At block 435, the first network device checks availability of a number of channels for linking with the second network device therethrough. In one example, both the first network device and the second network device are both multi-link devices (MLDs) with MLO capability. In other words, the first network with MLO capability may check and determine if the second network device is also MLO capable. If either of the first network device or the second network device are incapable of MLO then the first network device negotiates the FTM transaction entirely on the first channel.

At block 440, the first network device determines one or more channel-parameters of each channel, out of the number of channels that are determined to be available (alternatively referred to as 'available channels'). In one example, the one or more channel-parameters may include, but not limited to, a bandwidth availability, a channel traffic, or number of network devices/stations on the particular channel. In another example, the first network device may parallelly check the available channels and the one or more parameters of each channel, out of the available channels.

At block 445, based on the one or more channel parameters, the first network device checks if an FTM transaction corresponding to the first number of requests (out of the plurality of requests) may be negotiated on the first channel itself. For example, if the first channel has one or more of conducive channel-parameters such as a low traffic, a high bandwidth, etc., then the entire FTM transaction may be performed on the first channel at the adjusted FTM response frequency. In another example, the FTM transaction may be performed on the first channel, and a second channel may be made available for any potential application/data transaction or for FTM requests from high priority network devices. As illustrated in block 450, the FTM transaction is performed on first channel. Whereas, based on the one or more channel-parameters, the first network device may decide to perform a part of the transaction on a first channel of the available channels.

At block 455, the first network device checks if a subset of the FTM transaction is to be performed on a second channel. The first network device checks if the second channel is having the channel-parameters to be conducive, to perform the subset of FTM transactions on the second channel. In one example, the FTM transaction—corresponding to the first number of FTM requests—may comprise two FTM bursts. A first FTM burst may be negotiated on the first channel and the negotiation of a second FTM burst on the second channel may be checked. In another example, the first network device may compare the one or more channel-parameters of the second channel with corresponding reference values. The reference parameters may be pre-set for a particular AP or the reference values may set by independently for each AP. The reference value may correspond to a threshold.

Based on check at block 455, at 460, the first network device may respond to a first FTM burst set of the FTM transaction on the first channel and a second burst set of the FTM transaction on the second channel. For example, a 'burst set' may include a plurality of FTM exchanges and each FTM exchange constitutes FTM frames and corresponding acknowledgement frames. The terms 'first,' 'second,' 'one,"other," another' is used to refer to similar elements/features at various instances, and not by way of any spatial, physical, sequential or any other relation. In the illustrated example, a subset of the FTM transaction may be performed on the second channel for efficient channel usage and the subset of the FTM transaction may be the second FTM burst set. In another example, the FTM transaction may comprise only one FTM burst, and the subset of the FTM burst may include one or more FTM exchanges. These one or more FTM exchanges may be negotiated at the adjusted FTM response frequency on the second channel. The negotiation of FTM transaction on one or more channels is performed at the adjusted FTM response frequency.

At block 465, the first network device may check, based on the one or more channel-parameters, whether the first FTM burst set may be performed completely on the first channel. The first FTM burst set may comprise a first FTM exchange set and a second FTM exchange set. A conducive aspect for performing the first FTM exchange set and the second FTM exchange set, respectively on the first channel and the second channel, is checked. Similarly, the first network device may check whether the second FTM burst set may be performed completely on the second channel.

At block 470, the first network device may perform, based on one or more channel-parameters, and based on check performed at block 465, the first FTM burst set may be performed entirely on the first channel. For example, the first network device may send acknowledgement related frames to the second network device—in response to the FTM request(s) along the first channel. Further, the first FTM burst set includes one or more FTM exchanges, which get negotiated on the first channel. Similarly, the first network device may check and respond whether to perform the second FTM burst set entirely on the second channel.

Based on the check at block 465, at 475, the first network may decide that a first FTM exchange set of the first FTM burst set is to be performed on the first channel and a second FTM exchange set of the first FTM burst set is to be performed on the second channel. In one example, the first network device may determine any occurrence of contention delay on the first channel, whereby the second FTM exchange set is performed on the second channel.

When the first network device or the second network device is MLO incompatible, then after block 430, block 450 may be performed. Rest of the blocks (e.g., 435, 440, 445, 455-475) would not be applicable. In some examples, the illustrated blocks 405-475 may have an alternate sequence and the current illustrated order is corresponding to one example. Many combinations and variations of the illustrated blocks and additional actions, which are discussed herein, are possible.

Figure 5:
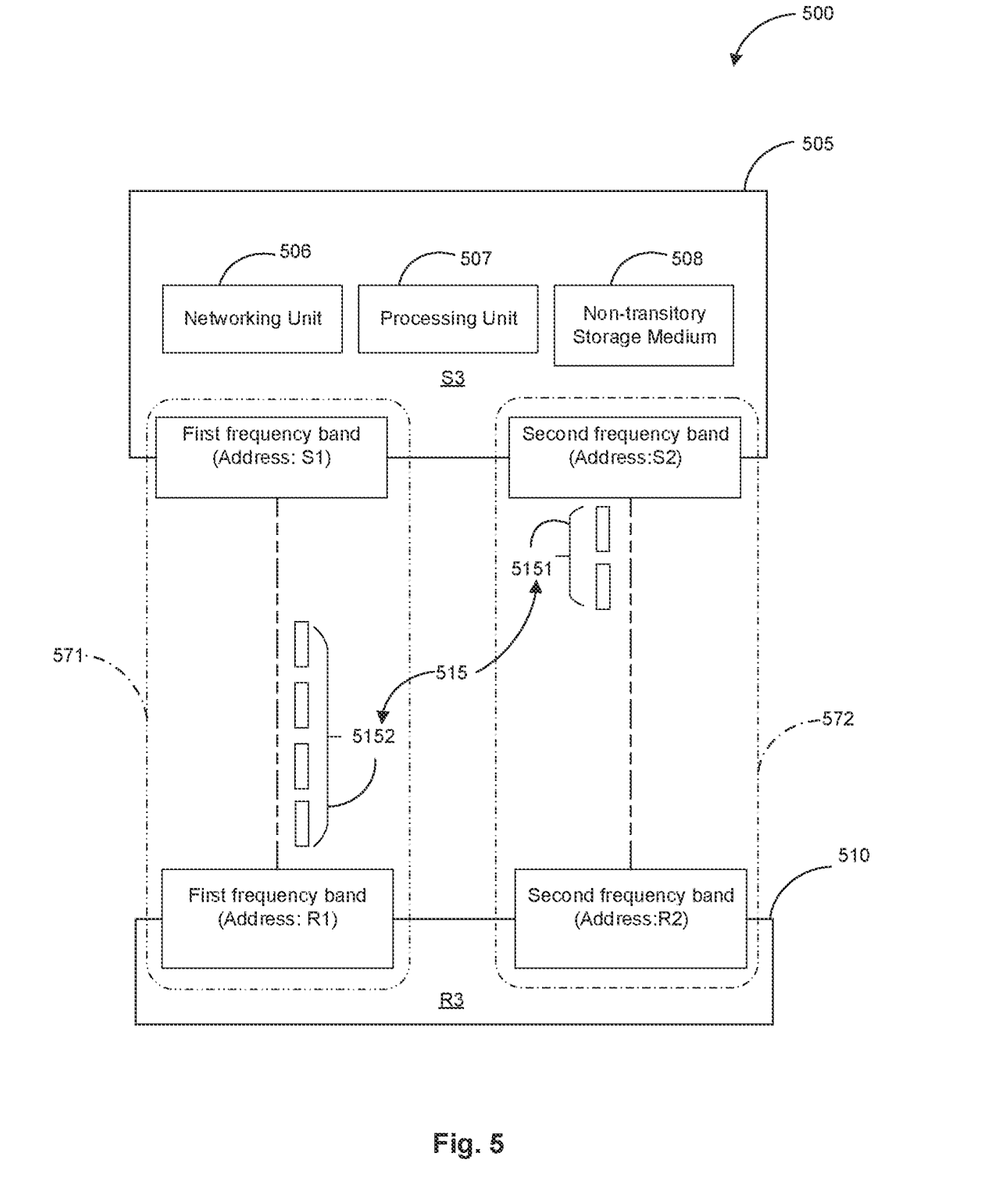
FIG. 5 illustrates a schematic view of a network illustrating FTM transaction, in accordance with an example of the present subject matter.

FIG. 5 illustrates a schematic view of a network 500 illustrating FTM transaction, in accordance with an example of the present subject matter. The current example illustrates the first network device 505, which can be an access point that is capable of multi-link operation. The second network device 510 may be a client device or another access point that is also capable of multi-link operation. Both the first network device 505 and the second network device 510 are MLDs, due to their MLO capability, whereby data can be sent and received over the available channels.

In the illustrated schematic, the second network device 510 is associated with the first network device 505 through a first channel 571 and a second channel 572. The first channel 571 can be a channel from a first frequency band and the second channel 572 can be a channel from a second frequency band. As per one example, the first frequency band can be a 2.4 GHz frequency band and the second frequency band can be a 5 GHz band. However, the frequency bands chosen are exemplary, as any other available frequency band may be used. In one example, the first channel and the second channel can be from the same frequency band. When choosing the first channel and the second channel from the same frequency band, sufficient gap may be maintained between the channels to avoid any interference. For example, the first channel may be at an upper end of a 5 GHz frequency band and the second channel may be at a lower end of the 5 GHz frequency band. Further, larger channel bandwidths available in certain frequency bands can be effectively utilized for negotiating to first number of FTM request out of a plurality of FTM request, form one or more client devices.

An FTM transaction 515, which is in response to a first number of FTM requests out of the plurality of FTM requests from the second network device 510, is depicted. The FTM transaction 515 constitutes a first FTM burst set 5151 and a second FTM burst set 5152. Based on the channel traffic, the first network device 505 may negotiate all the FTM exchanges on the first channel 571. However, in the illustrated example, the first network device 505 performs a first FTM burst set 5151 on the first channel 571 and the second FTM burst set 5152 on the second channel 572. In one example, the second FTM burst set 5152 being sent on the second channel 572 may be due to reordering or retransmission due to identification of non-conducive channel-parameter(s) on the first channel 571.

Further, the first FTM burst set 5151 may comprise one or more FTM exchanges, which may be performed on the first channel 571. Similarly, the second FTM burst set 5152 may comprise one or more FTM exchanges, which may be performed on the second channel 572. Further, in one example, a first FTM exchange set of the first FTM burst set 5151 may be performed on first channel 571 and a second FTM exchange set of the FTM burst set 5151 may be performed on the second channel 572. When two or more channels are available, the first network device 505 is capable of utilizing any subset of the channels—formed of two channels and based on based on channel-parameters of each channel of the subset of channels. In the illustrated only two channels are available. Further, the channel-parameters includes, but not limited to, a channel bandwidth, a channel traffic, and a number of network devices/stations available on the channel.

When sending frames corresponding to the FTM transaction on the second channel 572, then a transmitter address in the frame is set as S2 and receiver address is set as R2. Similarly, when sending frames on the first channel 571, then the transmitter address in the frame is set to S1 and the receiver address to R1. In addition to the addresses R1, R2, which correspond to the channels/radios, the network devices comprise of a third address R3/S3, which identifies the network device. For example, the first network device 505 may be identified by an address S3 and the second network device 510 may be identified as R3, in order to complete the FTM transaction. In one example, the first channel is from 2.4 GHz band and, the second channel 572 is from 5 GHz band. Further, the first network device 505 may route at least a portion of the FTM transaction through the second channel, which may operate at 6 GHz. The selection of 6 GHz bands and associated channels may be based on availability of that particular frequency band on either of the devices, whereby a larger channel bandwidth may be utilized. In another example, subject to non-conducive channel-parameters on any one of the first channel 571 or the second channel 572, a portion of the FTM request may be performed on a third channel, whereby a subset of channels is changed. Further, the first network device 505 includes a processing unit 507, which may fetch decode and execute instructions, corresponding to the selection of subset of channels and the adjustment of FTM response frequency, from a non-transitory storage medium 508. The first network device 505 may include a networking unit 506 which may be used for linking with the second network device 510.

Figure 6:
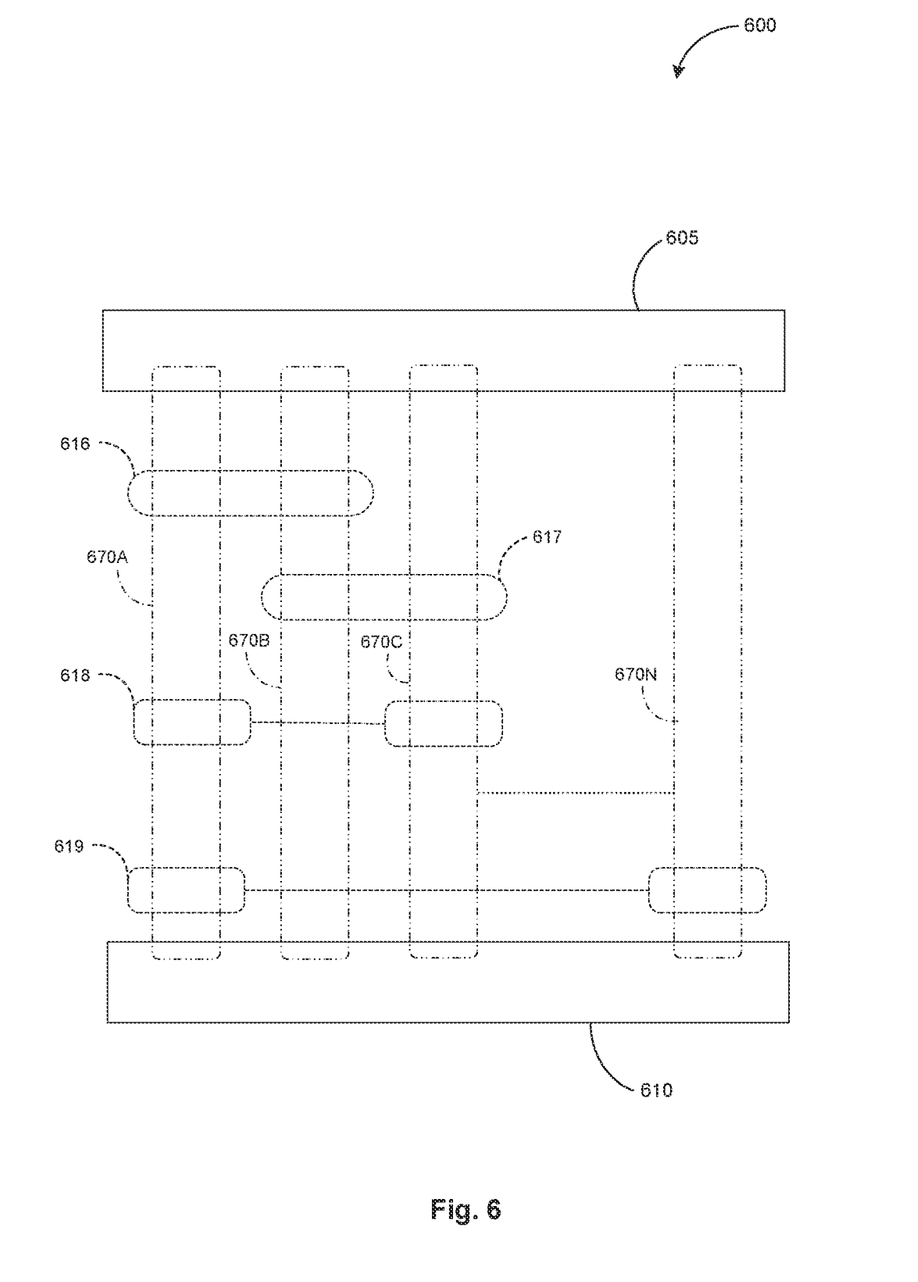
FIG. 6 illustrates a schematic view of a network illustrating a selection of subset of channels for FTM transaction, in accordance with an example of the present subject matter.

FIG. 6 illustrates a schematic view of a network 600 illustrating a selection of subset of channels, in accordance with an example of the present subject matter. The first network device 605 and the second network device 610 comprises two or more channels 670A-670N. The first network device 605 selects a subset of channels out of the two or more channels 670A-670N. For example, a first subset of channels 616 is constituted by a first channel 670A and a second channels 670B. Similarly, a second subset of channels 617 is constituted by the second channel 670B and a third channel 670C. So on, in the current example, N such channels are available. A subset of channels (e.g., two channels) is selected by the first network device 605, based on one or more channel-parameters of each channel. The first network device 605 selects the subset of channels to perform the FTM transactions. For example, a fourth subset of channels 619 can be formed by the first channel 670A and an $N^{th}$ channel 670N.

In one example, a first portion of a FTM transaction may be performed on the subset of channels constituted by a first channel 670A and a second channel 670B. The selection of the subset of channels is not limited to sequential channels. For example, for performing a second portion of the FTM transaction, the first channel 670A and the third channel 670C constitute a third subset of channels 618. The first network device responds at an adjusted FTM response frequency on the subset of channels being selected and the FTM response frequency may be adjusted based on the channel traffic along the available channels.

In one example, an FTM transaction may be initiated on the first subset of channels 616. The first network device 605 may reorder frames related to a portion of the FTM transaction and transmit them on the first channel 670A or the second cannel 670B, due to non-conducive channel-parameters on any one channel during transmission. In another example, a subset of the FTM transaction may be retransmitted on the second subset of channels 617 due to non-conducive channel-parameters for transmission or for negotiation of FTM exchanges. The first network device 605 may select a different subset of channels due to conducive channel-parameters and performs certain portion of the FTM transaction on that subset of channels.

In another example, the first network device 605 may perform a second FTM transaction 617 on the second subset of channels 670B, 670C out of the number of channels. The first network device 605 may select any subset of channels. Furthermore, in one example, a first portion of the FTM transaction may include a first FTM burst set and a second portion of the FTM transaction may include a second. FTM burst set. In another example, the FTM transaction may include only one FTM burst set and the first portion may include a first FTM exchange set and the second portion may include a second FTM exchange set. At the adjusted. FTM response frequency, the first network device negotiates the FTM transaction on one or more subsets of channels.

The present subject matter is described with reference to the foregoing examples. Although specific examples have been illustrated and described herein, the scope of the subject matter as claimed is intended to cover any equivalents thereof. As other forms, details, and examples may be made without departing from the scope of the present subject matter.

We claim:

1. A method comprising:
   receiving, by a first network device, a plurality of fine timing measurement (FTM) requests from a second network device over a first channel;
   determining, by the first network device, a channel traffic along the first channel;
   accessing a lookup table that comprises the channel traffic and a FTM response frequency based on the channel traffic;
   selecting the FTM response frequency from the lookup table;
   adjusting, by the first network device, the FTM response frequency based on the selecting; and
   responding, by the first network device and based on the FTM response frequency, to only a first number of FTM requests out of the plurality of FTM requests and determining not to acknowledge a second number of FTM requests out of the plurality of FTM requests.

2. The method of claim 1, wherein the determination of the channel traffic along the first channel comprises:
   enumerating, by the first network device, the plurality of FTM requests raised by the second network device during a selected time period; and
   comparing, by the first network device, enumerated FTM requests with a first request threshold.

3. The method of claim 2, wherein the adjustment of the FTM response frequency, by the first network device, is based on the enumerated FTM requests crossing the first request threshold.

4. The method of claim 1, wherein the first network device adjusts the FTM response frequency to be between a minimum threshold frequency and a maximum threshold frequency, wherein each of the minimum threshold frequency and the maximum threshold frequency is adjustable.

5. The method of claim 1, wherein the adjustment of the FTM response frequency comprises:
   reducing, by the first network device, the FTM response frequency when the channel traffic along the first channel crosses a channel traffic threshold.

6. The method of claim 1, wherein the adjustment of the FTM response frequency comprises:
   varying, by the first network device, the FTM response frequency in an inverse relation with the channel traffic being determined.

7. The method of claim 1, wherein the responding, by the first network device and along the first channel, to only the first number of FTM requests during a selected time period.

8. A first network device comprising:
   a processing unit; and
   a non-transitory computer readable storage medium storing a plurality of instructions, the plurality of instructions executable by the processing unit to:
      receive a plurality of fine timing measurement (FTM) requests from a second network device over a first channel;
      determine a channel traffic along the first channel;
      access a lookup table that comprises the channel traffic and a FTM response frequency based on the channel traffic;
      select the FTM response frequency from the lookup table;
      adjust the FTM response frequency depending on the selecting; and
      respond to only a first number of FTM requests out of the plurality of FTM requests, based on the FTM response frequency and determine not to acknowledge a second number of FTM requests out of the plurality of FTM requests.

9. The first network device of claim 8, wherein the processing unit is further to:
   adjust the FTM response frequency by reducing the FTM response frequency, wherein the first network device retains a channel bandwidth for one or more potential requests from one or more network devices, wherein the one or more network devices includes associated devices, and high priority devices.

10. The first network device of claim 8, wherein the processing unit is further to:
    determine availability of a number of channels for wireless connection between the first network device with the second network device, and wherein determine one or more channel-parameters of each channel of the number of channels being available, wherein the one or more channel-parameters includes a channel bandwidth, the channel traffic, and a number of network devices connected to channel.

11. The first network device of claim 10, wherein the processing unit is further to:
select a subset of channels out of available channels, to perform an FTM transaction corresponding to the first number of FTM requests.

12. The first network device of claim 11, wherein the processing unit is further to:
perform the FTM transaction along the subset of channels, selected based on the one or more channel-parameters of each channel, out of the number of the available channels.

13. The first network device of claim 12, wherein the processing unit is further to:
perform a first FTM burst set of the FTM transaction over a first channel of the subset of channels, and a second FTM burst set of the FTM transaction over a second channel of the subset of channels, based on the one or more channel-parameters.

14. The first network device of claim 13, wherein the processing unit is further to:
perform a first FTM exchange set of the first FTM burst set over the first channel, and a second FTM exchange set of the first FTM burst set over the second channel, based on the one or more channel-parameters.

15. The first network device of claim 11, wherein the processing unit is further to:
perform a first portion of the FTM transaction on a first subset of channels out of the available channels; and
perform a second portion of the FTM transaction on a second subset of channels out of the available channels.

16. The first network device of claim 11, wherein the first network device and the second network device comprise a multi-link operation capability, wherein at least a part of the FTM transaction is transmitted on a subset of channels out of the number of the available channels.

17. A non-transitory computer readable storage medium comprising a plurality of instructions, the plurality of the instructions executed by a processing unit to:
receive a plurality of fine timing measurement (FTM) requests from a second network device over a first channel;
determine a channel traffic along the first channel;
access a lookup table that comprises the channel traffic and a FTM response frequency based on the channel traffic;
select the FTM response frequency from the lookup table;
adjust the FTM response frequency depending on the selecting; and
respond to only a first number of FTM requests out of the plurality of FTM requests based on the FTM response frequency and determine not to acknowledge a second number of FTM requests out of the plurality of FTM requests.

18. The non-transitory computer readable storage medium of claim 17, wherein the plurality of instructions executable by the processing unit further to:
determine the channel traffic along the first channel by comparing with a channel traffic threshold.

19. The non-transitory computer readable storage medium of claim 17, wherein the plurality of instructions executable by the processing unit further to:
enumerate the plurality of FTM requests raised by the second network device during a selected time period; and
compare the enumerated FTM requests with a first request threshold.

20. The non-transitory computer readable storage medium of claim 18, wherein adjusting of the FTM response frequency is performed when enumerated FTM requests crosses a first request threshold even when the channel traffic along the first channel is less than the channel traffic threshold.

21. The method of claim 1, wherein the lookup table is accessed from a location outside the first network device.

* * * * *